United States Patent
Hada

(10) Patent No.: US 9,665,482 B2
(45) Date of Patent: May 30, 2017

(54) SYSTEM AND METHOD FOR SELECTING VICTIM MEMORY BLOCK FOR GARBAGE COLLECTION

(71) Applicant: Nidhi Mittal Hada, Kolkata (IN)

(72) Inventor: Nidhi Mittal Hada, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/748,191

(22) Filed: Jun. 23, 2015

(65) Prior Publication Data

US 2016/0283369 A1    Sep. 29, 2016

(30) Foreign Application Priority Data

Mar. 28, 2015   (IN) .......................... 1601/CHE/2015

(51) Int. Cl.
G06F 12/02        (2006.01)
G06F 12/121       (2016.01)

(52) U.S. Cl.
CPC ...... *G06F 12/0253* (2013.01); *G06F 12/0246* (2013.01); *G06F 12/121* (2013.01); *G06F 2212/1036* (2013.01); *G06F 2212/1044* (2013.01); *G06F 2212/69* (2013.01); *G06F 2212/702* (2013.01); *G06F 2212/7205* (2013.01); *G06F 2212/7211* (2013.01)

(58) Field of Classification Search
USPC ........................................................ 711/170
See application file for complete search history.

(56) References Cited

U.S. PATENT DOCUMENTS

| | | | |
|---|---|---|---|
| 5,341,339 | A | 8/1994 | Wells |
| 8,060,718 | B2 | 11/2011 | Freitas et al. |
| 2007/0294490 | A1 | 12/2007 | Freitas et al. |
| 2010/0100663 | A1 | 4/2010 | Kao et al. |
| 2010/0287328 | A1 | 11/2010 | Feldman et al. |

(Continued)

OTHER PUBLICATIONS

Guangxia Xu et al., "Garbage collection policy to improve durability for flash memory", *IEEE Transactions on Consumer Electronics*, IEEE Service Center, vol. 58, No. 4, Nov. 2012, pp. 1232-1236.

(Continued)

*Primary Examiner* — Mardochee Chery
(74) *Attorney, Agent, or Firm* — Finnegan, Henderson, Farabow, Garrett & Dunner, LLP

(57) ABSTRACT

Embodiments of present disclosure disclose method and system for selecting victim memory block for garbage collection. A memory block having minimum valid unit count is identified. Wear count bit of memory block to be null wear count or non-null wear count is determined. Memory block is selected as victim memory block for garbage collection upon determining memory block having null wear count. A plurality of memory blocks are divided into first set of memory blocks and second set of memory blocks upon determining memory block having non-null wear count. Minimum valid unit count and wear count bit are identified for each memory block in each set. Division is iterated until a first target memory block having minimum valid unit count and null wear count from one of first set of memory blocks and second set of memory blocks is identified. Final target memory block is selected as victim memory block for garbage collection.

18 Claims, 7 Drawing Sheets

(56) References Cited

U.S. PATENT DOCUMENTS

| | | |
|---|---|---|
| 2012/0317342 A1 | 12/2012 | Choi et al. |
| 2014/0032617 A1 | 1/2014 | Stanfill |
| 2014/0032817 A1* | 1/2014 | Bux .................. G06F 12/0246 711/103 |
| 2014/0173183 A1 | 6/2014 | Shin et al. |

OTHER PUBLICATIONS

Kim H-J et al. "An effective flash memory manager for reliable flash memory space management", *IEICE Transactions on Information and Systems*, Information & Systems Society, vol. E85-D, No. 6, Jun. 1, 2002, pp. 950-964.

Anonymous, "Divide and conquer algorithms", *Wikipedia*, Sep. 23, 2013, pp. 1-7.

European Search Report issued Jun. 14, 2016, in European Patent Office in counterpart European Patent No. Application 16160240.4, 12 pages.

* cited by examiner

SYSTEM AND METHOD FOR SELECTING VICTIM MEMORY BLOCK FOR GARBAGE COLLECTION

PRIORITY CLAIM

This U.S. patent application claims priority under 35 U.S.C. §119 to: India application No. 1601/CHE/2015, filed Mar. 28, 2015. The entire content of the aforementioned application is incorporated herein by reference.

TECHNICAL FIELD

The present subject matter is related, in general to a storage device and more particularly, but not exclusively to a method and a system for selecting a victim memory block in a storage device for garbage collection.

BACKGROUND

In general, a mass storage system is used for data storage. For example, the mass storage system can be a Solid State Drive (SSD) and/or a flash memory. Typically, the flash memory is made of flash electrically erasable and programmable read only memory cells. The memory cells are organized into a plurality of blocks. Each of the plurality of blocks comprises a plurality of pages where each page is configured to store data. Usually, during write operation and/or write cycle on the flash memory, data is written into the plurality of memory blocks. But, after a predetermined amount of time and due to frequent write cycles into the plurality of memory blocks, the plurality of memory blocks can become fully occupied having no free space to store further data for next write cycle. In such a scenario, a Flash Translation Layer (FTL) of the mass storage system triggers garbage collection, if a new write request is received for data storage in the plurality of memory blocks. The garbage collection is triggered to select a memory block among the plurality of memory blocks as a victim memory block for freeing up space i.e. erasing pages in the memory block in order to store the data in next write cycle in the freed-up pages.

In one conventional approach, the memory block is selected as a victim memory block among the plurality of memory blocks based on minimum number of valid pages contained in the memory block. The number of valid pages refers to number of pages currently in usage for data storage in the memory block. After selecting the memory block as the victim memory block, the valid pages of the memory block are collected in a separate block called garbage collection block. Then, the victim memory block is erased and converted into the garbage collection block which becomes a new memory block containing the data of the victim memory block. This garbage collection block being the new memory block having the data can be used for next garbage collection cycle and/or operation. However, there exists a problem when frequent erase and write cycles are carried out on the same memory block since the memory block becomes unusable for data storage after a finite number of erase and rewrite cycles. Such a frequent erase and write cycles on the same memory block leads to wearing of the memory block. Particularly, increased wearing of the target block leads to end of lifetime of the memory block for data storage.

The conventional approach performs write operation sequentially on each of the plurality of blocks to avoid uneven usage of the plurality of blocks for garbage collection. In such a way, the conventional approach avoids excessive wearing of each of the plurality of blocks. However, once the memory block i.e. the victim memory block is converted to the garbage collection block, the victim memory block is used for write operation in the next run of garbage collection. Hence, this victim memory block becomes the first block which is written second time in comparison to other plurality of blocks. In such a case, the conventional approach of victim block selection may lead to uneven wearing of a physical region of flash due to being rewritten first.

SUMMARY

Disclosed herein is a method for selecting a victim memory block in a storage device for garbage collection. The method comprises identifying a memory block having a minimum valid unit count among a plurality of memory blocks in the storage device. The method comprises determining a wear count bit of the identified memory block to be one of a null wear count and a non-null wear count. The method comprises selecting the identified memory block as the victim memory block for garbage collection upon determining the identified memory block having the null wear count. The method further comprises performing upon determining the identified memory block having the non-null wear count, dividing the plurality of memory blocks into a first set of memory blocks and a second set of memory blocks. A minimum valid unit count and a wear count bit are identified for each memory block in the first set of memory blocks and the second set of memory blocks. The method comprises iterating the division until a first target memory block having the minimum valid unit count and the null wear count from one of the first set of memory blocks and the second set of memory blocks is identified. The method comprises selecting the final target memory block as the victim memory block for garbage collection.

In an aspect of the present disclosure, a block selection system for selecting a victim memory block in a storage device for garbage collection is disclosed. The block selection system comprises a processor and a memory communicatively coupled to the processor. The memory stores processor-executable instructions, which, on execution, cause the processor to identify a memory block having a minimum valid unit count among a plurality of memory blocks in the storage device. The processor is configured to determine a wear count bit of the identified memory block to be one of a null wear count and a non-null wear count. The processor is configured to ascertain the identified memory block as the victim memory block for garbage collection upon determining the identified memory block having the null wear count. The processor is further configured to perform upon determining the identified memory block having the non-null wear count, divide the plurality of memory blocks into a first set of memory blocks and a second set of memory blocks. A minimum valid unit count and a wear count bit are identified for each memory block in the first set of memory blocks and the second set of memory blocks. The processor is configured to iterate the division until a first target memory block having the minimum valid unit count and the null wear count from one of the first set of memory blocks and the second set of memory blocks is identified. The processor is configured to ascertain the final target memory block as the victim memory block for garbage collection.

In another aspect of the present disclosure, a non-transitory computer readable medium for selecting a victim memory block in a storage device for garbage collection is disclosed. The non-transitory computer readable medium includes instructions stored thereon that when processed by a processor causes a block selection system of the storage device to perform operations comprising identifying a memory block having a minimum valid unit count among a plurality of memory blocks in the storage device. Then, a wear count bit of the identified memory block to be one of a null wear count and a non-null wear count is determined. Next, the identified memory block as the victim memory block is ascertained for garbage collection upon determining the identified memory block having the null wear count. Upon determining the identified memory block having the non-null wear count, the medium performs dividing the plurality of memory blocks into a first set of memory blocks and a second set of memory blocks. A minimum valid unit count and a wear count bit are identified for each memory block in the first set of memory blocks and the second set of memory blocks. Then, the division is iterated until a first target memory block having the minimum valid unit count and the null wear count from one of the first set of memory blocks and the second set of memory blocks is identified. Next, the first target memory block as the victim memory block for garbage collection.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
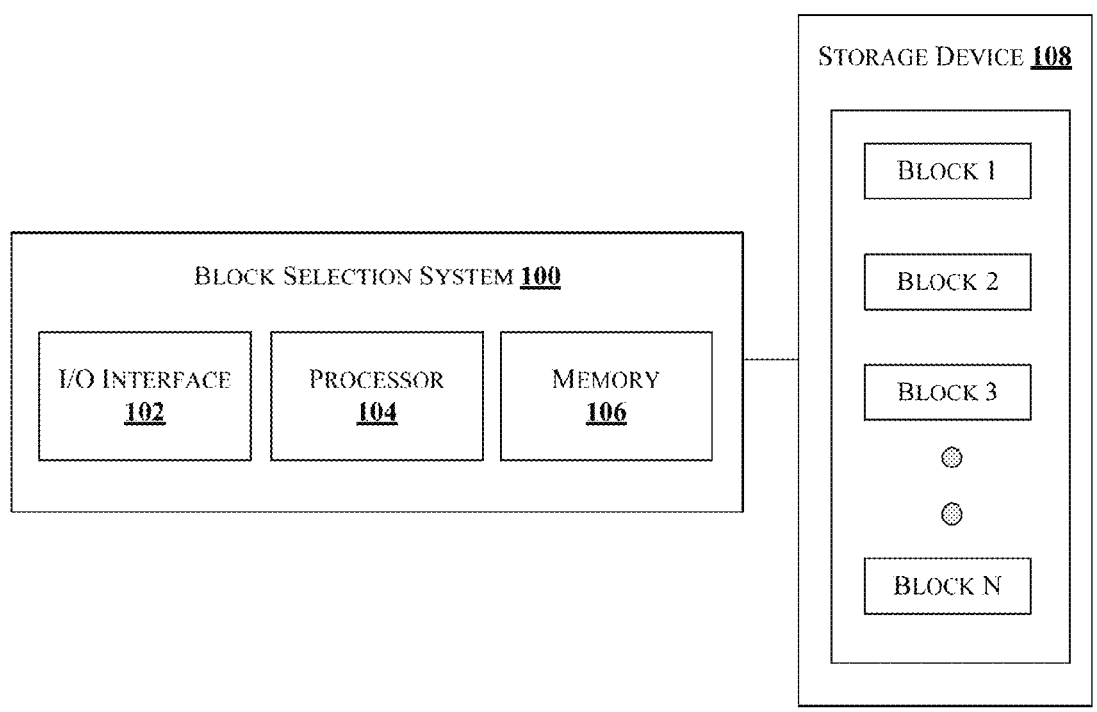
FIG. 1 illustrates a block diagram of a block selection system with an I/O interface, a processor and a memory connected to a storage device having a plurality of memory blocks in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure are related to a method and a system for selecting a victim memory block in a storage device for garbage collection. The method comprises identifying a memory block that contains a minimum valid unit count among a plurality of memory blocks contained in the storage device. The valid unit count refers to number of valid pages contained in the memory block used for data storage. Then, a wear count bit of the memory block having the minimum valid unit count is determined as either to be a null wear count or a non-null wear count. The wear count bit relates to a wear count which refers to number of times the memory block is used as a victim memory block in previous cycle of garbage collection. The null wear count refers to a bit "0" which means that the memory block is never used for garbage collection. The non-null wear count refers to a bit "1" which means that the memory block is used at least once for garbage collection. In case, the null wear count for the memory block having the minimum valid unit count is determined, then the memory block having the null wear count and the minimum valid unit count is ascertained as a victim memory block for garbage collection. In case, if the non-null wear count is determined for the memory block having the minimum valid unit count, then method performs division of the plurality of memory blocks contained in the storage device. Particularly, the plurality of memory blocks is divided into a first set of memory blocks and a second set of memory blocks around the memory block having the non-null wear count in a form of tree nodes.

In such tree, the memory block having the non-null wear count becomes a parent node for the first set of memory blocks and the second set of memory blocks. For each memory block of the first set of memory blocks and the second set of memory blocks, a minimum valid unit count and a wear count bit are determined. The division is iterated until a first target memory block having the minimum valid unit count and the null wear count is identified either from the first set of memory blocks or from the second set of memory blocks. Then, the first target memory block is ascertained as the victim memory block for garbage collection. Further, during iteration, if any sibling node i.e. sibling memory block having the minimum valid unit count and the null wear count from remaining of the set of memory blocks is identified. Then the sibling memory block is merged with the first target memory block for garbage collection.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of a block selection system 100 with an I/O interface 104, a processor 106 and a memory 108 connected to a storage device 108 having 'n' number of memory blocks in accordance with some embodiments of the present disclosure. In an embodiment, the block selection system 100 may be, for example, a flash controller for selecting a victim memory block among the plurality of memory blocks in the storage device 108.

In one implementation, the storage device 108 includes, without limitation, a flash memory. The flash memory can be non-volatile flash memory and/or volatile flash memory. The non-volatile flash memory includes, without limitation, Negative-AND type flash memory and Negative-OR type flash memory. The flash memory can include Solid State Drive (SSD) based memory. In an embodiment, the storage device 108 comprises 'n' number of memory blocks namely block 1, block 2, block 3, . . . , up to block N. Each of the plurality of memory blocks comprises a plurality of pages where each page is configured to store data. In an embodiment, the storage device 108 is configured as a part of one or more computing devices (not shown in FIG. 1). The one or more computing devices include, but are not limited to, mobiles phones, Personal Computers (PC), desktop computers, Personal Digital Assistants (PDAs), laptop, tablet, smartwatch, notebook, audio- and video-file players (e.g., MP3 players and iPODs), and e-book readers (e.g., Kindles and Nooks), smartphone, wearable device, digital cameras, synthesizers, video games, scientific instrumentation, industrial robotics, medical electronics and the like. In an embodiment, the block selection system 100 may be connected to a main memory (e.g. Random Access Memory (RAM) or Read Only Memory (ROM)) having the plurality of memory blocks of the one or more computing devices. Thus, the block selection system 100 is enabled to perform selection of the victim memory block among the plurality of memory blocks in the storage device 108 and/or in the main memory of the one or more computing devices for garbage collection.

The block selection system 100 may include Input/Output (I/O) interface 102, at least one central processing unit ("CPU" or "processor") 104, and the memory 106 through which the victim memory block in the storage device 108 and/or in the main memory of the one or more computing devices is ascertained for garbage collection.

The I/O interface 102 is a medium through which a trigger for garbage collection to ascertain the victim memory block among the plurality of memory blocks in the storage device 108 is received by the block selection system 100. In one implementation, the trigger for garbage collection may be received upon occurrence of one or more events which requires allocation of some space in the plurality of memory blocks. In an embodiment, the I/O interface 102 is coupled with the processor 104.

The processor 104 may comprise at least one data processor for executing program components for executing user- or system-generated garbage collection routine for selecting the victim memory block for garbage collection. In one example, the processor 104 can be a controller, for example, a flash controller for selecting the victim memory block in the flash memory. In one implementation, the processor 104 may be connected to main CPU and the main memory of the one or more computing devices. In an embodiment, the processor 104 performs evaluating valid unit count of each memory block of the plurality of memory blocks for identifying a memory block having a minimum valid unit count. The processor 104 determines a wear count bit of the identified memory block having the minimum valid unit count to be either a null wear count (refers to wear count bit "0") or a non-null wear count (refers to wear count bit "1"). Particularly, the processor 104 determines whether the identified memory block having the minimum valid unit count comprises wear count bit as "0" or "1" from a wear count bitmap table. In an embodiment, the wear count bit data stores the wear count bit of the memory blocks in a form of tables. The processor 104 ascertains the identified memory block as the victim memory block for garbage collection upon determining the identified memory block having the null wear count. Upon selecting, the processor 104 sets the wear count bit of the ascertained memory block as the non-null wear count in the wear count bitmap table. Further, the processor 104 increments the wear count of the ascertained memory block in a wear count data. Additionally, the processor 104 increments a victim memory block count when a selection of the victim memory block is performed. Particularly, the processor 104 increments the victim memory block count by 1 when the selection of the victim memory block is performed. In an embodiment, the processor 104 sets the wear count bit in the wear count bitmap table to zero and the victim memory block count to zero when the victim memory block count is more than a predefined threshold victim memory block count for triggering a next garbage collection routine. The processor 104 performs division of the plurality of memory block around the identified memory block by masking the identified memory block upon determining the identified memory block having the non-null wear count. Particularly, the processor 104 performs division of the plurality of memory blocks into a first set of memory blocks and a second set of memory block. While performing the division, the processor 104 identifies a minimum valid unit count and a wear count bit for each memory block in the first set of memory blocks and the second set of memory blocks. The processor 104 is configured to iterate the divisions until a first target memory block having the minimum valid unit count and the null wear count is identified from one of the first set of memory blocks and the second set of memory blocks. The first target memory block is ascertained by the processor 104 as the victim memory for garbage collection. Upon selecting the first target memory block, the processor 104 sets the wear count bit of the first target memory block as the non-null wear count in the wear count bitmap table. Further, the wear count of the first target memory block is incremented by 1 when the first target memory block is selected as the victim memory block. Additionally, the processor 104 increments the victim memory block count by 1 when selection of the first target memory block as the victim memory block is performed. In an embodiment, the processor 104 sets the wear count bit in the wear count bitmap table to zero and the victim memory block count to zero when the victim memory block count is more than the predefined threshold victim memory block count for triggering the next garbage collection routine. The processor 104 is further configured to identify a second (sibling) target memory block having the minimum valid unit count and the null wear count from remaining set of memory blocks among the first set of memory blocks and the second set of memory blocks during iteration. The processor 104 merges the first target memory block and the second (sibling) target memory block for garbage collection. In an embodiment, the processor 104 sets the wear count bit of the second target memory block as the non-null wear count in the wear count bitmap table. Further, the wear count of the merged block comprising the first and second target memory blocks is incremented by 1 when the second target memory block is selected as the victim memory block. The processor 104 increments the victim memory block count by 1. The selection of the victim memory block is performed by various modules which are explained in following description. The various modules are executed by the processor 104 of the block selection system 100.

The memory 106 stores instructions which are executable by the at least one processor 104. The memory 106 stores valid unit count data, wear count data, wear count bit data, and victim memory block count data of each memory block of the plurality of memory blocks along with the predefined threshold victim memory block count. In an embodiment, the valid unit count data, the wear count data, the wear count bit data and the victim memory block count data along with the predefined threshold victim memory block count are stored as one or more data required for selecting the victim memory block among the plurality of memory blocks for garbage collection. The one or more data are described in the following description of the disclosure.

Figure 2:
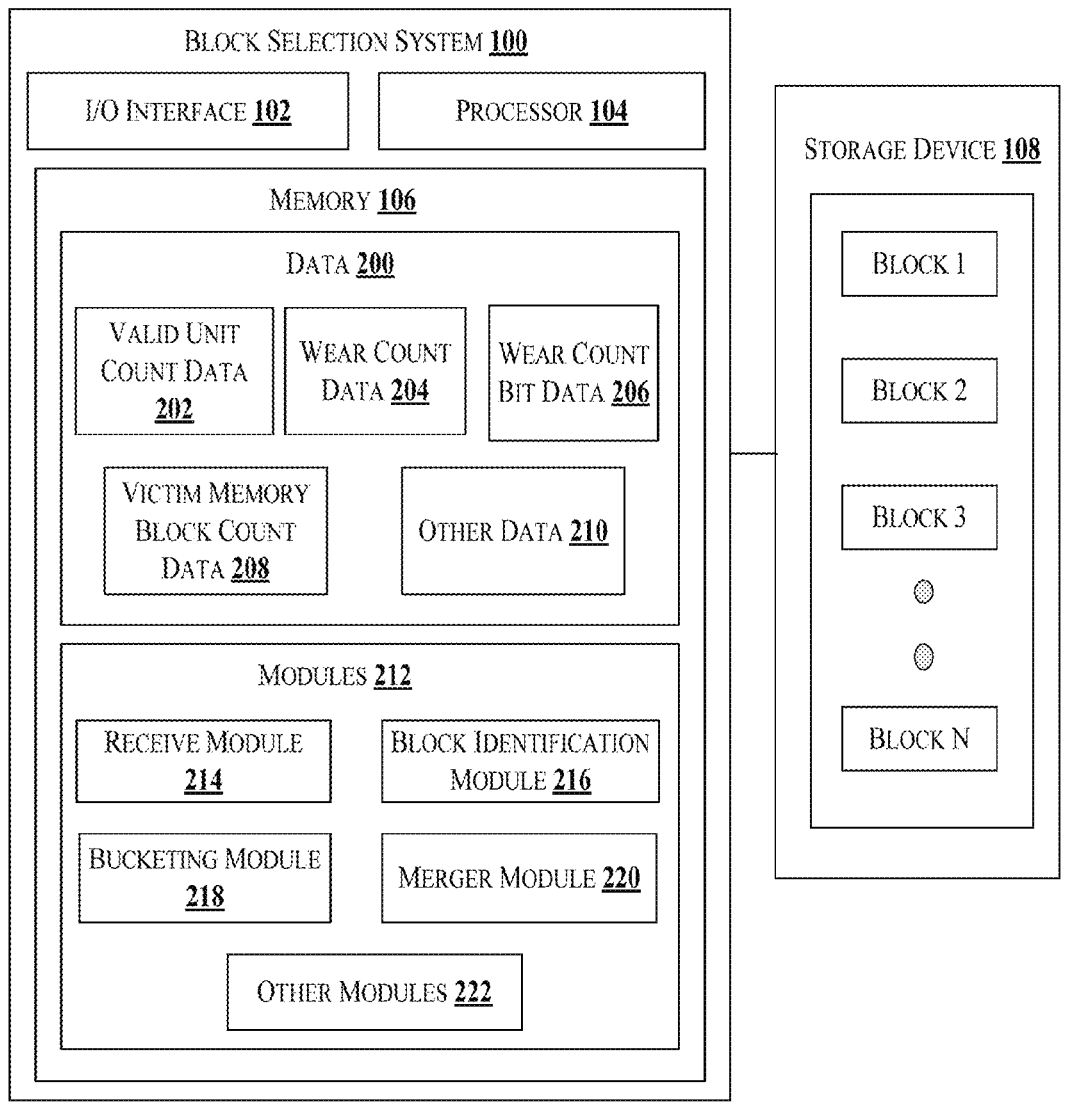
FIG. 2 illustrates a block diagram of an exemplary block selection system with various data and modules for selecting a victim memory block among a plurality of memory blocks in a storage device for garbage collection in accordance with some embodiments of the present disclosure.

FIG. 2 illustrates a block diagram of an exemplary block selection system 100 with various data and modules for selecting the victim memory block among the plurality of memory blocks in the storage device 108 for garbage collection in accordance with some embodiments of the present disclosure. In the illustrated FIG. 2, the one or more data 200 and the one or more modules 210 stored in the memory 106 are described herein in detail.

In an embodiment, the one or more data 200 may include, for example, the valid unit count data 202, the wear count data 204, the wear count bit data 206, the victim memory block count 208 and other data 210 for selecting the victim block for garbage collection.

The valid unit count data 202 of a memory block refers to a count of valid pages which are being used for data storage in the memory block. The count of valid pages of each memory block is maintained in a valid page count table. For example, consider the flash memory in the desktop computer comprises 100 memory blocks namely block 1, block 2, block 3, . . . , block 100. Considering, each block from 1 to 100 comprises 100 pages respectively. Assuming, 25 pages out of 100 pages are consumed for data storage in block 1, 36 pages out of 100 pages are consumed for data storage in block 2 and so on. In block 1, the valid unit count of block 1 is 25, since 25 pages are used for data storage. Similarly, valid unit count of block 2 is 36 pages since 36 pages are used for data storage.

The wear count data 204 refers to a wear count which is defined as number of times the memory block among the plurality of memory blocks is used for garbage collection. Particularly, wear count data 204 refers to number of times the memory block experiences wearing during erasing space in the memory block for garbage collection. For example, consider the block 1 is freed up twice for garbage collection. In such a case, the wear count of block 1 is 2. Consider the block 2 is freed up 5 times for garbage collection, hence, the wear count of block 2 is 5. Consider the block 3 is never used for freeing up the space, hence, the wear count of block 3 is 0.

The wear count bit data 206 refers to the wear count bit related to the wear count. In an embodiment, the wear count bit of the memory block is either null wear count or non-null wear count. In an embodiment, the null wear count is defined with bit "0" when the memory block is never used for garbage collection. Particularly, when the wear count of the memory block is zero, then the wear count bit is defined to be null wear count with bit "0". For example, the wear count for block 3 is considered to be null wear count and defined with bit "0" since block 3 is never used for freeing up space for garbage collection in the garbage collection routine. In an embodiment, the non-null wear count is defined with bit "1" when the memory block is used at least once for garbage collection. Particularly, when the wear count of the memory block is more than zero, then the wear count bit is defined to be non-null wear count with bit "1". For example, the wear count for block 1 and block 2 is considered to be non-null wear count and defined with bit "1" respectively since both block 1 and block 2 are used at least once for garbage collection in the garbage collection routine.

The victim memory block count data 208 refers to number of times the selection of a victim memory block is performed for garbage collection. In an embodiment, the victim memory block count data 208 is maintained in a form of tables which is referred as the victim memory block count table. In one implementation, each time a victim memory block among the plurality of memory blocks is selected, the victim memory block count is incremented by 1 in the victim memory block count table.

In an embodiment, the data 200 comprises the predefined threshold victim memory block count which refers to maximum number of times the victim memory block selection for the garbage collection is performed. For example, the threshold victim memory block count can be set as 10 which means that the victim memory block selection takes place maximum for 10 times. In an embodiment, when the victim memory block count is more than the predefined threshold victim memory block count, then the wear count bitmap table is set to zero and the victim memory block count in the victim memory block count table is set to zero (0).

The other data 210 may refer to such data which can be preconfigured in the block selection system 100 for selecting the victim memory block for garbage collection.

In an embodiment, the one or more data 200 in the memory 106 are processed by the one or more modules 210 of the block selection system 100. The one or more modules 212 may be stored within the memory 106 as shown in FIG. 2. In an example, the one or more modules 212, communicatively coupled to the processor 104, may also be present outside the memory 106 and implemented as hardware.

Particularly, the one or more data 200 in the memory 106 including the valid unit count data 202, the wear count data 204, the wear count bit data 206 and the victim memory block count data 208 along with the predefined threshold victim memory block count are used by the one or more modules 212. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 212 may include, for example, a receive module 214, a block identification module 216, a bucketing module 218, and a merger module 220. The memory 106 may also comprise other modules 222 to perform various miscellaneous functionalities of the block selection system 100. It will be appreciated that such aforementioned modules may be represented as a single module or a combination of different modules.

In an embodiment, the receive module 214 receives the trigger of the garbage collection through the I/O interface 102 upon occurrence of an event. For example, downloading an application requires some storage space in the flash memory. Consider, all the memory blocks are occupied and the new write operation requires a memory block to be erased to store the application being downloaded. In such a case, the garbage collection routine is triggered to ascertain the victim block among the plurality of memory blocks for garbage collection.

The block identification module 216 is configured to identify the memory block having a minimum valid unit count among the plurality of memory blocks in the storage device 108. In an embodiment, the block identification module 216 identifies the memory block having the minimum valid unit count. For example, consider the flash memory comprises 10 blocks i.e. block 1, block 2, block 3, . . . , block 10. The valid unit count data 202 comprises valid unit count of each block from 1 to 10. Assuming, the valid unit count of block 1 is 25 pages, block 2 is 36 pages, block 3 is 4 pages, block 4 is 10 pages, . . . , block 10 is 55 pages. From the valid unit count of each memory block from 1 to 10, the block identification module 212 identifies the memory block 3 as the memory block having the minimum valid unit count since block 3 comprises only 4 pages as compared to other blocks 1 to 10.

Figure 3:
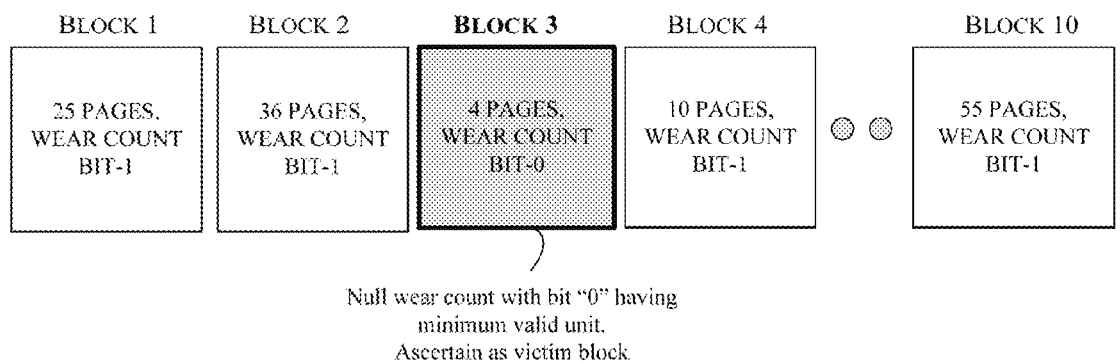
FIG. 3 illustrates an example for selecting a first target memory block having minimum valid unit count and null wear count in accordance with some embodiments of the present disclosure.

After identifying the memory block having the minimum valid unit count (e.g. memory block 3 with 4 pages), the block identification module 216 determines the wear count bit of the identified memory block to be one of the null wear count with bit "0" and the non-null wear count with bit "1". The wear count bit is related to the wear count. In case, the wear count bit of the identified memory block is determined to be null wear count with bit "0", then the identified memory block is ascertained as the victim memory block for garbage collection. For example, referring to FIG. 3, consider 10 blocks in the flash memory. Assuming, the valid unit count of block 1 is 25 pages, block 2 is 36 pages, block 3 is 4 pages, block 4 is 10 pages, . . . , block 10 is 55 pages. Assuming, the wear count bit of block 1 is 1, block 2 is 1, block 3 is 0, block 4 is 1, . . . , block 10 is 1. The block 3 is defined to be null wear count with bit "0" since block 3 has wear count bit as "0". and minimum valid unit count as compared to other blocks from 1 to 10. Thus, block 3 having the minimum valid unit count and the null wear count i.e. wear count bit as "0" is ascertained as the victim memory block for garbage collection. Upon selecting the identified memory block, the wear count bit of the identified memory block as the non-null wear count in the wear count bitmap table. For example, for block 3, the wear count bit is updated from "0" to "1". Further, the wear count of the block 3 is incremented by 1. Further, the victim memory block count is incremented by 1. For example, consider victim memory block selection is performed for the first time. Assuming, the block 3 is chosen as the victim memory block. Then, upon selecting the victim memory block, the victim memory block count is incremented by 1. In an embodiment, the wear count bit in the wear count bitmap table is set to zero and the victim memory block count to zero when the victim memory block count is more than the predefined threshold victim memory block count for triggering the next garbage collection routine. For example, considering for a garbage collection routine, the victim memory block is ascertained for 11 times which is greater than the predefined threshold victim memory block count being 10 times. Hence, the wear count bitmap table for the plurality of memory blocks is set to zero and the victim memory block count is set to zero.

In case, the identified memory block comprises the non-null wear count with wear count bit as "1", then the bucketing module 218 performs division of the plurality of memory blocks around the identified memory block. The bucketing module 218 divides the plurality of memory blocks into the first set of memory blocks and the second set of memory blocks. The bucketing module 218 mask the identified memory block having the minimum valid unit count and the non-null wear count while performing the division of the plurality of memory blocks. In mathematical manner, considering 0 to m blocks. Now, considering a 'nth' block whose wear count bit is non-null wear count and contains minimum valid unit count. The, the 'nth' block is masked, and for range of 0 to m blocks two buckets i.e. two sets of memory blocks are formed. The first set of memory blocks i.e. first bucket comprises 0 to n−1 blocks and the second set of memory blocks i.e. second bucket comprises n+1 to m blocks. For each memory block in the first set of memory blocks i.e. first bucket and the second set of memory blocks i.e. second bucket, a minimum valid unit count and a wear count bit is identified. If a target memory block with minimum valid unit count and null wear count with bit "0" is identified from either of the first set of memory blocks or the second set of memory blocks, then the division is stopped and the target memory block is ascertained as the victim memory block. In an embodiment, the division is iterated when no target memory block having minimum valid unit count and null wear count is identified from either of the first set of memory blocks or the second memory blocks. For each set of memory blocks, that is, for each of the first set of memory blocks i.e. first bucket and for each of the second set of memory blocks i.e. second bucket, the division is iterated recursively. The division is iterated until a first target memory block having the minimum valid unit count and the null wear count from one of the two buckets i.e. from the one of the first set of memory blocks and the second set of memory blocks is identified. Upon obtaining the first target memory block, the first target memory block is ascertained as the victim block for garbage collection.

Figure 4:
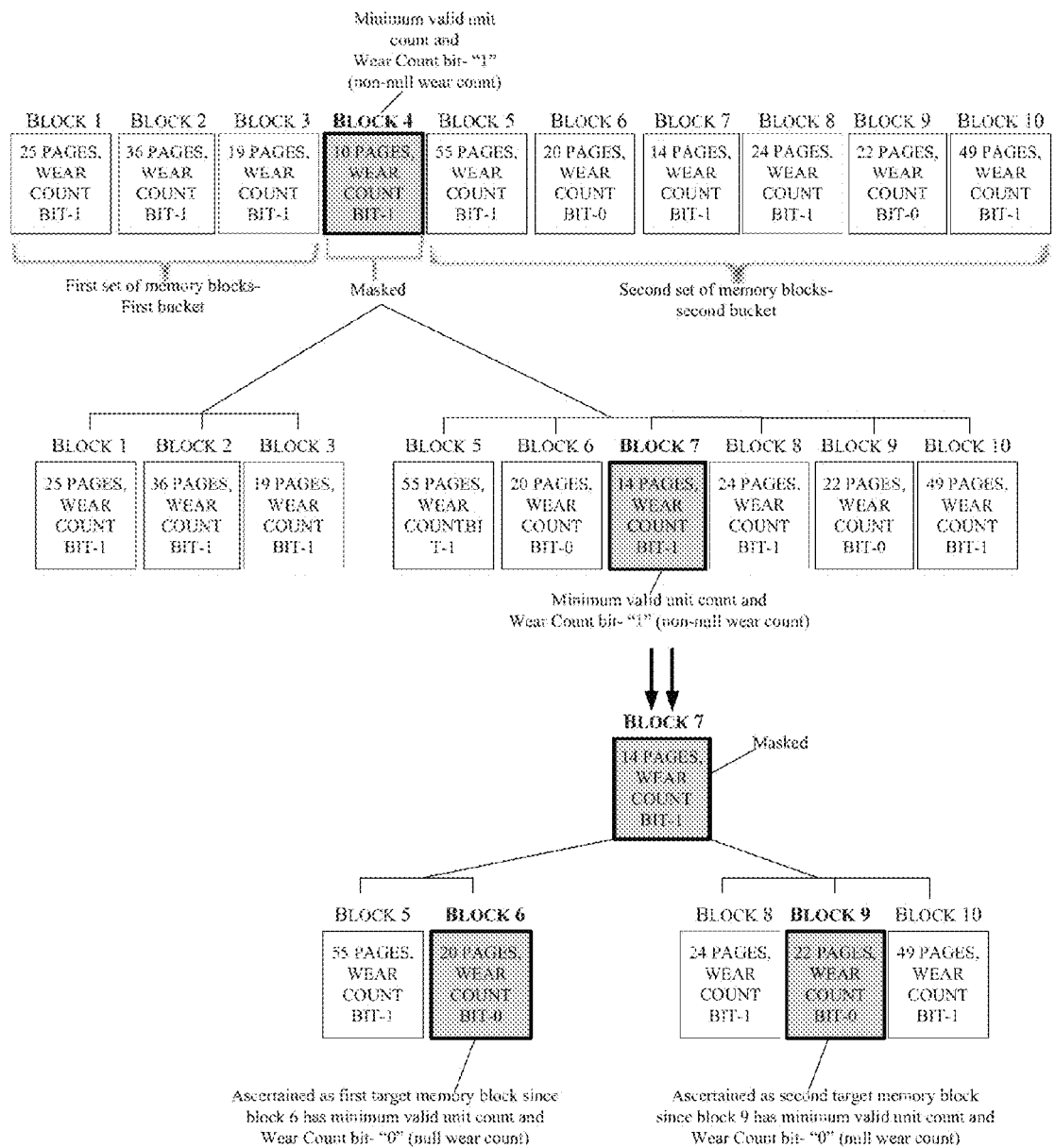
FIG. 4 shows an exemplary representation for forming buckets by dividing a plurality of memory blocks in accordance with some embodiments of the present disclosure.

For example, referring to FIG. 4, consider 10 blocks. The valid unit count of each of 10 blocks is as follows: 25 pages of block 1, 36 pages for block 2, 19 pages for block 3, 10 pages for block 4, 55 pages for block 5, 20 pages for block 6, 14 pages for block 7, 24 pages for block 8, 22 pages for block 9 and 49 pages for block 10. Upon evaluating the valid unit count of each memory block, block 4 is identified to be having minimum valid unit count. Now, for this block 4, wear count bit is determined to be one of null wear count and non-null wear count. Considering, the block 4 has the non-null wear count with bit "1". Now, the memory block from 1 to 10 are divided into the first bucket i.e. first set of memory blocks and second bucket i.e. second set of memory blocks around the block 4. The block 4 is masked for performing the division. In one example, the first set of memory blocks (first bucket) can be left nodes of the tree and the second set of memory blocks (second bucket) can be right nodes of the tree where the block 4 is a parent node. The first set of memory blocks i.e. the first bucket comprises block 1, block 2 and block 3. The second set of memory blocks i.e. the second bucket comprises block 5, block 6, block 7, block 8, block 9 and block 10. For each memory block from both of the first bucket and the second bucket, minimum valid unit count and wear count bit is identified. Considering, no first target memory block from either first set of memory blocks or second set of memory blocks is identified based on the minimum valid unit count and the wear count bit with "0". Therefore, the division is iterated from the memory block having the minimum valid unit count. That is, the division is iterated from block 7 which is containing minimum valid unit counts as compared to other memory blocks in the second set of memory blocks. Now, the wear count bit for the block 7 is identified to be "1". Therefore, the memory blocks around the block 7 are divided into further first set of memory blocks and second set of memory blocks. Now, after the memory blocks around the block 7, for each memory blocks i.e. for block 5, and block 6 in the first set of memory blocks and block 8, block 9, and block 10 in the second set of memory blocks, minimum valid unit count and wear count bit is determined. The division is iterated until the first target memory block from one of the left nodes i.e. first set of memory blocks and the right nodes i.e. second set of memory blocks of the tree is identified with minimum valid unit count and null wear count. In the illustrated FIG. 4, the block 6 is identified to be having minimum valid unit count and wear count bit of "0" i.e. null wear count. Therefore, block 6 is ascertained as the first target memory block i.e. as the victim memory block.

In an embodiment, a sibling memory block having the minimum valid unit count and the null wear count is identified during iteration of the division by the merger module 220. Particularly, a second target memory block having the minimum valid unit count and the null wear count is identified from a same parent node or parent memory block by the merger module 220. The second target memory block is identified from remaining set of memory blocks of the first set of memory blocks and the second set of memory blocks during the iteration. The sibling memory block or the second target memory block is identified by rising up the tree from the same parent node or parent memory block from which the first target memory block is ascertained as the victim memory block for garbage collection. Then, the merger module 220 merges the first target memory block and the second target memory block for garbage collection. In an embodiment, the wear count bit of a merged block comprising the first target memory block and the second target memory block i.e. sibling memory block is set to non-null wear count i.e. wear count bit as "1". For example, block 9 after iteration of division is determined to be the sibling memory block to the block 6 as block 9 emerges from same parent memory block 7 from where the block 6 is chosen. Further, block 9 is also having minimum valid unit count and the null wear count. Additionally, block 9 is chosen since the block 9 is fetched from other set of memory block other than the first set of memory blocks from where block 6 is already chosen as the victim memory block. Hence, the block 6 and block 9 are merged which becomes the merged block for garbage collection.

In an embodiment, one or more memory blocks among the plurality of memory blocks after division are dissolved or deleted for the process of garbage collection. In case, in a considered range of memory blocks, a few memory blocks with wear count bit set as "1" have higher valid unit count than the valid unit count of other memory blocks with wear count bit as "0", in the same bucket or set of memory blocks, all those buckets or sets of memory blocks are dissolved or deleted. The buckets are formed only if the memory block has wear count bit as "1" i.e. non-null wear count along with minimum valid unit count.

The other modules 222 processes all such operations required to ascertain the victim block for garbage collection.

Figure 5A:
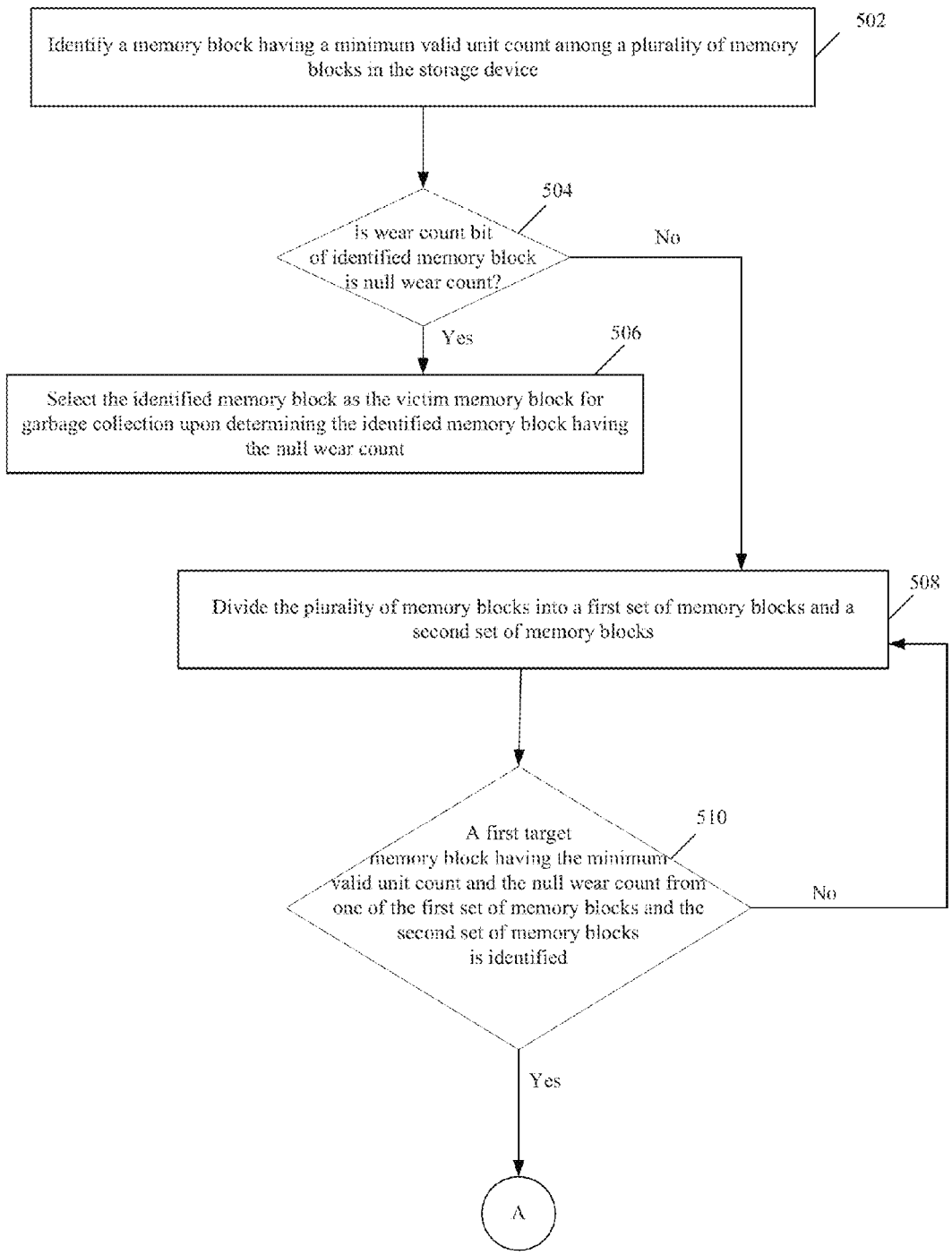
FIGS. 5a and 5b shows a flowchart illustrating a method for selecting a victim memory block for garbage collection in accordance with some embodiments of the present disclosure.
Figure 5B:
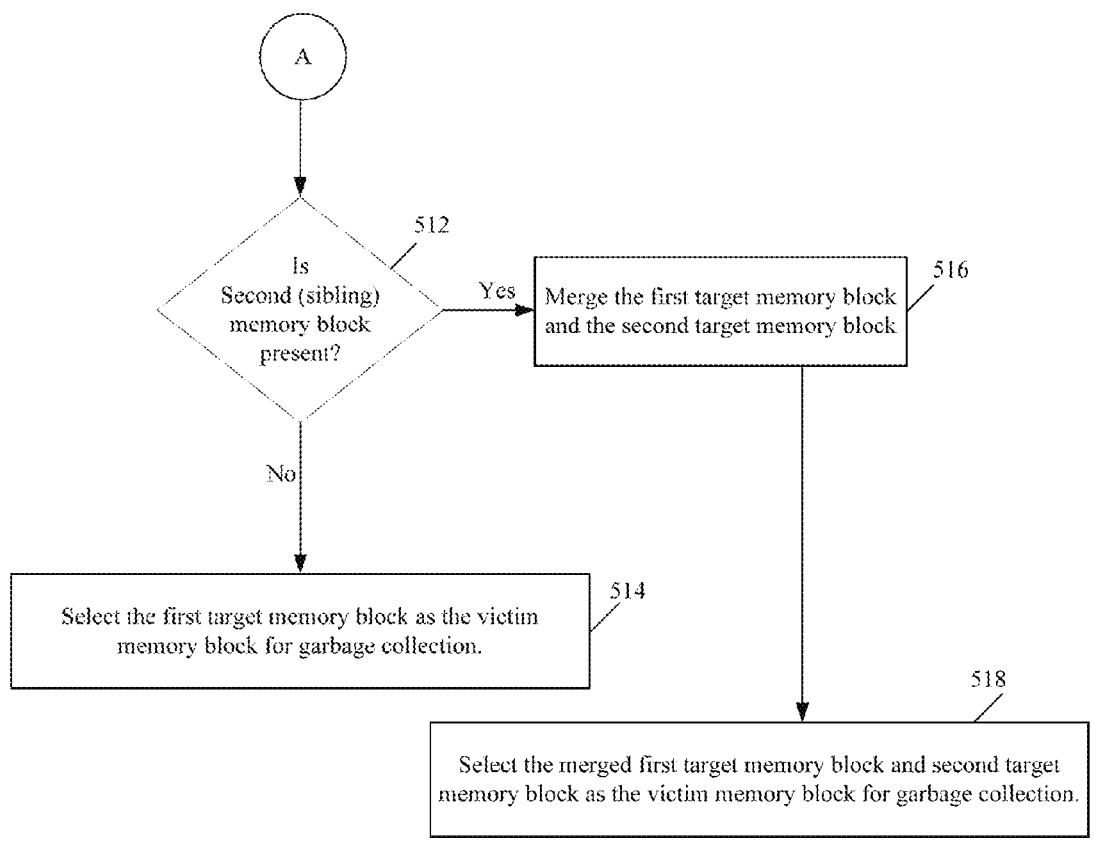

FIGS. 5a and 5b show flowcharts illustrating method 500 for selecting the victim memory block for garbage collection in accordance with some embodiments of the present disclosure.

As illustrated in FIGS. 5a and 5b, the method comprises one or more blocks for selecting the victim block for garbage collection. The method may be described in the general context of computer executable instructions. Generally, computer executable instructions can include routines, programs, objects, components, data structures, procedures, modules, and functions, which perform particular functions or implement particular abstract data types.

The order in which the method is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 502, the memory block having the minimum valid unit count among the plurality of memory blocks in the storage device is identified.

At block 504, the wear count bit of the identified memory block to be one of the null wear count and the non-null wear count is determined. If the identified memory block having the minimum valid unit count comprises the null wear count with bit "0", then the process proceeds to block 506 via "Yes". At block 506, the identified memory block having the minimum valid unit count and the null wear count is selected as the victim memory block for garbage collection.

In an embodiment, the wear count bit of the selected memory block is set to non-null wear count i.e. wear count bit "1". Additionally, the victim memory block count is increment by 1. If the identified memory block having the minimum valid unit count comprises the non-null wear count with bit "1", then the process goes to block 508 via "No". Upon determining the wear count bit of the identified memory block as the non-null wear count, the process proceeds to block 508.

At block 508, the plurality of memory blocks are divided into the first set of memory blocks and the second set of memory block. The division of the plurality of memory blocks into the first set of memory blocks and the second set of memory blocks is performed by masking the identified memory block having non-null wear count. For each memory block in the first set of memory blocks and the second set of memory blocks, a minimum valid unit count and a wear count bit are identified.

At block 510, a condition is checked whether the first target memory block having the minimum valid unit count and null wear count is identified from either first set of memory blocks or second set of memory blocks. If the first target memory block having the minimum valid unit count and null wear count is identified from either first set of memory blocks or second set of memory blocks, then the division is stopped. If the first target memory block having the minimum valid unit count and null wear count is identified at block 510, then the process goes to block 512 via "Yes" as shown in FIG. 5b.

At block 512, a condition is checked whether the sibling i.e. the second target memory block is identified from same parent memory block corresponding to the first target memory block during iteration of division. Particularly, the condition at block 512 is checked whether the second target memory block having the minimum valid unit count and the null wear count is identified from remaining set of memory blocks of the first set of memory blocks and the second set of memory blocks during the iteration. If the sibling i.e. the second target memory block is not identified, then the process goes to block 514 via "No".

At block 514, the first target memory block is selected as the victim memory block for garbage collection. In an embodiment, the wear count bit for the first target memory block is set to non-null wear count. Additionally, the victim memory block count is incremented by 1.

At block 512, if the sibling i.e. the second target memory block is identified, then the process goes to block 516.

At block 516, the first target memory and the second (sibling) target memory block are merged.

At block 518, the merged first target memory block and the second (sibling) memory block is selected as the victim memory block for garbage collection as shown in FIG. 5b. In an embodiment, the wear count bit for the merged memory block is set to non-null wear count i.e. wear count bit "1". Additionally, the victim memory block count is incremented by 1.

But, at block 510, if the first target memory block having the minimum valid unit count and null wear count is not identified from either first set of memory blocks or second set of memory blocks, then the process goes to block 508 where the division is iterated until the first target memory block having the minimum valid unit count and the null wear count from one of the first set of memory blocks and the second set of memory blocks is identified.

In an embodiment, one or more memory blocks among the plurality of memory blocks after division are dissolved or deleted for the process of garbage collection. In case, in a considered range of memory blocks, a few memory blocks with wear count bit set as "1" have higher valid unit count than the valid unit count of other memory blocks with wear count bit as "0", in the same bucket or set of memory blocks, all those buckets or sets of memory blocks are dissolved or deleted. The buckets are formed only if the memory block has wear count bit as "1" i.e. non-null wear count along with minimum valid unit count.

Computer System

Figure 6:
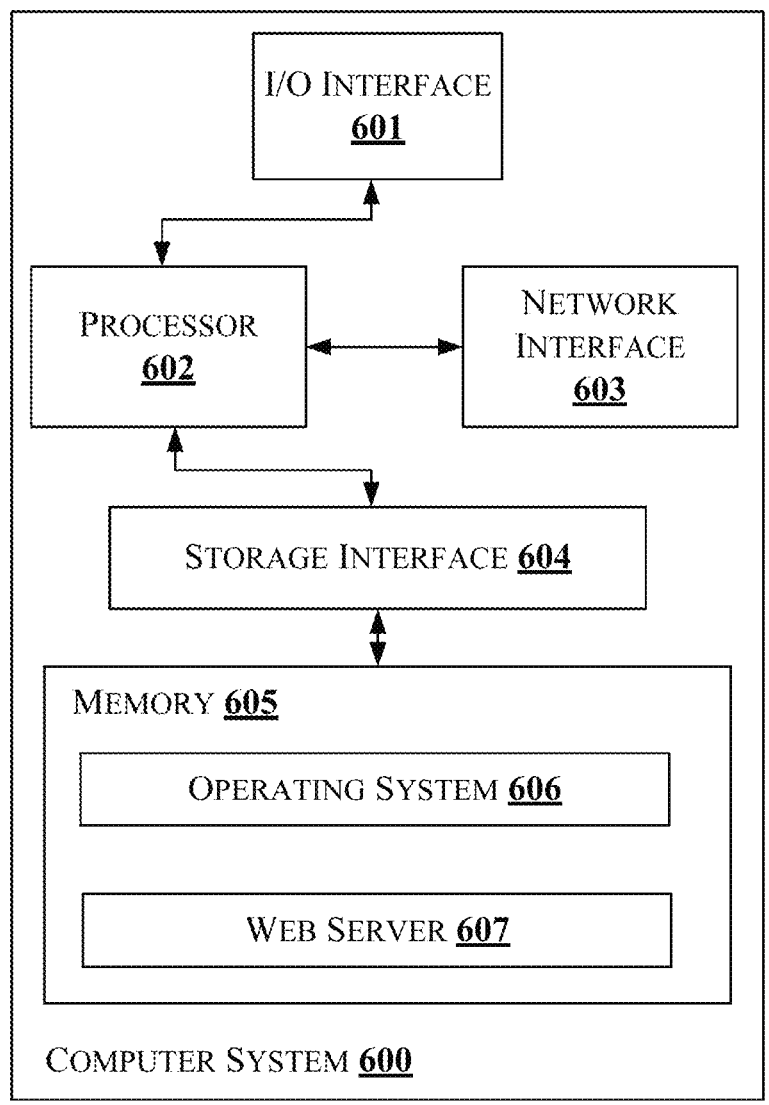
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 is used to implement the block selection system 100. The computer system 600 ascertains the victim memory block for garbage collection. The computer system 600 may comprise a central processing unit ("CPU" or "processor") 602. The processor 602 may comprise at least one data processor for executing program components for executing user- or system-generated garbage collection routine. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, an operating system 606, web server 607 etc. In some embodiments, computer system 600 may store user/application data, such as the data, variables, records, etc. as described in this disclosure. Such databases may be implemented as fault-tolerant, relational, scalable, secure databases such as Oracle or Sybase.

The operating system 606 may facilitate resource management and operation of the computer system 600. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 600 may implement a web browser 607 stored program component. The web browser 608 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 607 may utilize facilities such as AJAX, DHTML, Adobe Flash, JavaScript, Java, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 600 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure select the victim block mainly based on the wearing of the memory blocks in order to avoid frequent wearing of the memory blocks for garbage collection. In such a way, the lifetime of the memory blocks is saved and accurately used for next garbage collection routine.

Embodiments of the present disclosure select the victim block having the minimum valid unit counts. In such a way, the memory block with maximum valid pages are avoided to be chosen as the victim memory block and the memory blocks which can create maximum free space are chosen.

Embodiments of the present disclosure enhances lifetime of flash memories i.e. Solid State Drives (SSD).

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 5*a* and 5*b* show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Block Selection System |
| 102 | I/O Interface |
| 104 | Processor |
| 106 | Memory |
| 108 | Storage Device |
| 200 | Data |
| 202 | Valid Unit Count Data |
| 204 | Wear Count Bitmap Data |
| 206 | Other Data |
| 208 | Modules |
| 210 | Receive Module |
| 212 | Block Identification Module |
| 214 | Bucketing Module |
| 216 | Merger Module |
| 228 | Other Modules |
| 600 | Computer System |
| 601 | I/O Interface |
| 602 | Processor |
| 603 | Network Interface |
| 604 | Storage Interface |
| 605 | Memory |
| 606 | Operating System |
| 607 | Web Server |

What is claimed is:

1. A method for selecting a victim memory block in a storage device for garbage collection comprising:
   identifying, by a block selection system, a memory block having a minimum valid unit count among a plurality of memory blocks in the storage device;
   determining, by the block selection system, a wear count bit of the identified memory block to be one of a null wear count and a non-null wear count;
   selecting, by the block selection system, the identified memory block as the victim memory block for garbage collection upon determining the identified memory block having the null wear count; and
   performing, by the block selection system, upon determining the identified memory block having the non-null wear count:
      dividing the plurality of memory blocks into a first set of memory blocks and a second set of memory blocks, wherein a minimum valid unit count and a wear count bit is identified for each memory block in the first set of memory blocks and the second set of memory blocks;
      iterating the division until a first target memory block having the minimum valid unit count and the null wear count from one of the first set of memory blocks and the second set of memory blocks is identified; and
      selecting the target memory block as the victim memory block for garbage collection.

2. The method as claimed in claim 1 further comprising:
   identifying, by the block selection system, a second target memory block having the minimum valid unit count and the null wear count from remaining set of memory blocks of the first set of memory blocks and the second set of memory blocks during the iteration; and
   merging, by the block selection system, the first target memory block and the second target memory block for garbage collection.

3. The method as claimed in claim 1, wherein the plurality of memory blocks is divided into the first set of memory blocks and the second set of memory blocks by masking the identified memory block having non-null wear count.

4. The method as claimed in claim 1, wherein the wear count bit relates to a wear count of the identified memory block that corresponds to number of times the memory block is used for garbage collection.

5. The method as claimed in claim 1, wherein the wear count bit of the identified memory block is null when the identified memory block is never used for garbage collection.

6. The method as claimed in claim 1, wherein the wear count bit of the identified memory block is non-null when the identified memory block is used at least once for garbage collection.

7. A block selection system for selecting a victim memory block in a storage device for garbage collection comprising:
   a processor;
   a memory communicatively coupled to the processor, wherein the memory stores processor-executable instructions, which, on execution, cause the processor to:
      identify a memory block having a minimum valid unit count among a plurality of memory blocks in the storage device;
      determine a wear count bit of the identified memory block to be one of a null wear count and a non-null wear count;
      select the identified memory block as the victim memory block for garbage collection upon determining the identified memory block having the null wear count; and
      perform upon determining the identified memory block having the non-null wear count:
         divide the plurality of memory blocks into a first set of memory blocks and a second set of memory blocks, wherein a minimum valid unit count and a wear count bit is identified for each memory block in the first set of memory blocks and the second set of memory blocks;
         iterate the division until a first target memory block having the minimum valid unit count and the null wear count from one of the first set of memory blocks and the second set of memory blocks is identified; and
         select the final target memory block as the victim memory block for garbage collection.

8. The block selection system as claimed in claim 7, wherein the processor is further configured to:

identify a second target memory block having the minimum valid unit count and the null wear count from remaining set of memory blocks of the first set of memory blocks and the second set of memory blocks during the iteration; and merge the first target memory block and the second target memory block for garbage collection.

9. The block selection system as claimed in claim 7, wherein the processor masks the identified memory block having non-null wear count to divide the plurality of memory blocks into the first set of memory blocks and the second set of memory blocks.

10. The block selection system as claimed in claim 7, wherein the wear count bit relates to a wear count of the identified memory block that corresponds to number of times the memory block is used for garbage collection.

11. The block selection system as claimed in claim 7, wherein the wear count bit of the identified memory block is null when the identified memory block is never used for garbage collection.

12. The block selection system as claimed in claim 7, wherein the wear count bit of the identified memory block is non-null when the identified memory block is used at least once for garbage collection.

13. A non-transitory computer readable medium including instructions stored thereon that when processed by a processor cause a block selection system to perform acts of:

identifying a memory block having a minimum valid unit count among a plurality of memory blocks in a storage device;

determining a wear count bit of the identified memory block to be one of a null wear count and a non-null wear count;

selecting the identified memory block as the victim memory block for garbage collection upon determining the identified memory block having the null wear count; and performing upon determining the identified memory block having the non-null wear count:

dividing the plurality of memory blocks into a first set of memory blocks and a second set of memory blocks, wherein a minimum valid unit count and a wear count bit is identified for each memory block in the first set of memory blocks and the second set of memory blocks;

iterating the division until a first target memory block having the minimum valid unit count and the null wear count from one of the first set of memory blocks and the second set of memory blocks is identified; and selecting the final target memory block as the victim memory block for garbage collection.

14. The medium as claimed in claim 13, wherein the instructions further cause the processor to perform operations comprising identifying a second target memory block having the minimum valid unit count and the null wear count from remaining set of memory blocks of the first set of memory blocks and the second set of memory blocks during the iteration; and merging the first target memory block and the second target memory block for garbage collection.

15. The medium as claimed in claim 13, wherein the plurality of memory blocks is divided into the first set of memory blocks and the second set of memory blocks by masking the identified memory block having non-null wear count.

16. The medium as claimed in claim 13, wherein the wear count bit relates to a wear count of the identified memory block that corresponds to number of times the memory block is used for garbage collection.

17. The medium as claimed in claim 13, wherein the wear count bit of the identified memory block is null when the identified memory block is never used for garbage collection.

18. The medium as claimed in claim 13, wherein the wear count bit of the identified memory block is non-null when the identified memory block is used at least once for garbage collection.

* * * * *